United States Patent
Lozano et al.

(10) Patent No.: US 7,194,286 B2
(45) Date of Patent: Mar. 20, 2007

(54) METHOD FOR OPTIMIZING THE TRANSMIT SIGNAL IN MULTIPLE ANTENNA WIRELESS LINKS

(75) Inventors: Angel Lozano, Hoboken, NJ (US); Sergio Verdu, Princeton, NJ (US); Antonia Tulino, Sperone (IT)

(73) Assignee: Lucent Technologies Inc., Murray Hill, NJ (US)

( * ) Notice: Subject to any disclaimer, the term of this patent is extended or adjusted under 35 U.S.C. 154(b) by 426 days.

(21) Appl. No.: 10/673,224

(22) Filed: Sep. 30, 2003

(65) Prior Publication Data

US 2005/0070323 A1    Mar. 31, 2005

(51) Int. Cl.
*H04B 7/02* (2006.01)
(52) U.S. Cl. .................. 455/562.2; 455/101; 455/522; 375/299; 370/334
(58) Field of Classification Search ................ 455/101, 455/561, 562.1, 522; 375/299; 370/334
See application file for complete search history.

(56) References Cited

U.S. PATENT DOCUMENTS 6,707,862 B1 *   3/2004  Larsson ...................... 375/326
6,760,567 B1 *   7/2004  Jeong et al. .............. 455/67.11
6,763,237 B1 *   7/2004  Katz .......................... 455/450
7,020,110 B2 *   3/2006  Walton et al. .............. 370/334

OTHER PUBLICATIONS

Visotsky, Eugene et al."Space-Time Transmit Precoding With Imperfect Feedback." IEEE Transactions on Information Theory, vol. 47, No. 6, Sep. 2001, pp. 2632-2639.

Jorswieck, Eduard et al. "On Transmit Diversity With Imperfect Channel State Information." Proceedings Of International Conference on Acouistics, Speech and Signal Processing. May 13, 2002, pp. 2181-2184.

Nabar, Rohit U. et al. "Transmit Optimization for Spatial Multiplexing in the Presence of Spatial Fading Correlation." IEEE Global Telecommunications Conference, Nov. 25-29, 2001; pp. 131-135.

European Search Report, dated Jan. 26, 2005.

\* cited by examiner

*Primary Examiner*—Edward F. Urban
*Assistant Examiner*—Adeel Haroon

(57) ABSTRACT

In the method, spatial steering of parallel symbol streams and a transmit power of each symbol stream is determined based on a statistical distribution of a channel. The determined spatial steering and transmit powers may then be applied by a transmitter to optimize the transmit signal.

7 Claims, 1 Drawing Sheet ically achieved when

METHOD FOR OPTIMIZING THE TRANSMIT SIGNAL IN MULTIPLE ANTENNA WIRELESS LINKS

BACKGROUND OF THE INVENTION

The use of multiple transmit and receive antennas can enable very large increases in the capacity—defined as the throughput or bit rate that can be reliably conveyed—of wireless communication systems. For a given set of transmit and receive antennas, the highest capacity is attained when the transmit signal in the multiple antenna wireless links is optimized. This is straightforward when both the transmitter and the receiver can track the instantaneous state of the radio channel between them. Such tracking is fairly simple at the receiver, but very challenging at the transmitter, particularly in mobile systems, because of the fast-changing nature of the channel. Namely, by the time the receiver can report the instantaneous state of the channel to the transmitter such that the transmitter can adapt to the instantaneous state, the instantaneous state has changed. Hence, it is often the case that the transmitter must operate without up-to-date reliable information about the instantaneous response of the channel, and sub-optimal covariance and thus capacity is achieved.

SUMMARY OF THE INVENTION

The present invention provides a method of optimizing transmit signal for a multiple antenna transmitter using a statistical distribution of the channel. As stated above, the receiver has knowledge of the instantaneous state of the channel. This is typically because the transmitter transmits pilot signals known a priori to the receiver, which may then derive the instantaneous state. As further stated above, the transmitter lacks knowledge of this instantaneous state. Statistical information about the channel, however, is available because the channel is short-term stationary and thus its statistics remain unchanged for an amount of time that is hundreds or even thousands of times longer than the amount of time over which its instantaneous state varies. The distribution is the set of possible instantaneous states and the probability associated with each one, where each probability indicates the probability that the associated instantaneous state currently characterizes the channel.

In one exemplary embodiment, spatial steering of parallel symbol streams and a transmit power of each symbol stream is determined based on a statistical distribution of a channel. For example, respective steering vectors for the parallel symbol streams are determined as the eigenvectors of the expected distribution of the channel matrix multiplied by its transpose conjugate.

In an exemplary embodiment, the transmission power for each symbol stream is determined based on a previously determined transmission power for the symbol stream and the statistical distribution of the channel. In this manner, the determined transmission power for each symbol stream finds and tracks the optimal transmission power for each symbol stream.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EXEMPLARY EMBODIMENTS

Figure 1:
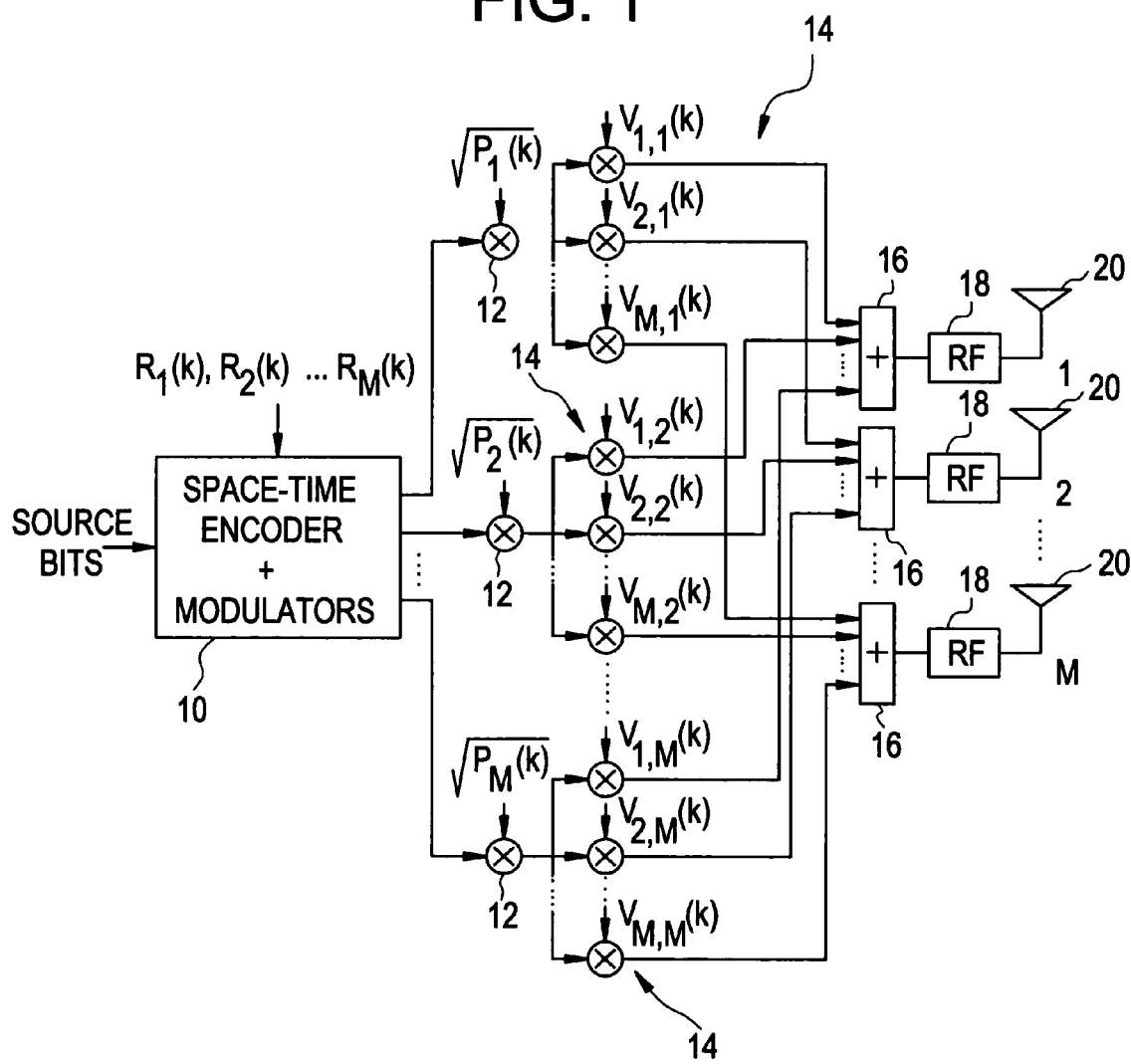
FIG. 1 illustrates an exemplary structure of a transmitter to which the method of the present invention may be applied.

A multiple antenna wireless system having M transmit and N receive antennas may be modeled at baseband as:

$$y = Hx + n$$

where x is an M-dimensional vector representing the transmit signal that we want to optimize, H is an N×M matrix representing the channel between each transmit and receive antenna, y is an N-dimensional vector representing the received signal and n is another N-dimensional vector that represents the noise. The noise is modeled as Gaussian and white, but the generalization to non-white noises is straightforward. The channel, in turn, is considered frequency-flat over the bandwidth of x but, again, the extension to frequency-selective channels is straightforward by one of several well-known methods (such as breaking x into a number of disjoint narrow sub-signals, equalizing y to flatten the channel, etc). With a frequency-flat channel, the entries of x, y, H and n are scalars, and, in general, are complex to accommodate in-phase and quadrature components.

As stated above, the receiver has knowledge of the matrix H at all times. This is typically achieved by the transmitter transmitting pilot signals known a priori to the receiver, from which H can be derived. As further stated above, the transmitter lacks knowledge of the matrix H. Statistical information about H, however, is available because H is short-term stationary and thus its statistics remain unchanged for an amount of time that is hundreds or even thousands of times longer than the amount of time over which H itself varies. The instantaneous response of the channel can be used to derive the distribution of the matrix H in any well-known statistical manner. The distribution of H is the set of possible values H can take and the probability associated with each one, where each probability indicates the probability that the associated instantaneous value corresponds to the actual H.

This distribution of H changes slowly over time and thus the transmitter must also slowly vary its settings accordingly. We shall indicate by T the duration of time over which the covariance of the generated signal remains unchanged and we index by a counter k the succession of such intervals.

Also, we denote by P the power available for transmission and thus we have that $$E[x^H x] = E[Tr\{xx^H\}] = P$$

where $(\cdot)^H$ indicates the transpose conjugate of a vector or matrix, $Tr\{\cdot\}$ indicates the trace of a matrix, and $E[\cdot]$ indicates expectation, i.e. average over the distribution of some quantity. Finally, $\sigma^2$ indicates the arithmetic mean of the noise variances at the N receive antennas.

FIG. 1 illustrates an exemplary structure of a transmitter to which the method of the present invention may be applied. This is a well-known structure that enables the generation of a signal with arbitrary structure, and will provide a context for better understanding the method of the present invention. As shown, a space-time encoders and modulators block receives a stream of bits (referred to as source bits) that are to be conveyed to a receiver reliably. These bits are encoded and then mapped onto M complex modulated symbol streams in a well-known manner. The amount of information embedded onto each symbol in a symbol stream is determined by a rate $R_m(k)$, $m=1, \ldots, M$ provided to the space-time encoders and modulators block 10 for each respective symbol stream. At each interval k there are thus M such rates. Some of these rates may be zero at times indicating that the corresponding symbol will not be used during that interval and hence no information should be embedded therein. These rates may be supplied to the transmitter by the receiver or they may be computed directly at the transmitter (in which case the structure of the receiver must be known therein). Because the operation and structure of the space-time encoders and modulators block 10 is well-known in the art, this block will not be described in detail for the sake of brevity.

Each of the M symbol streams (also interchangeably referred to herein simply as "symbols") outputted by the space-time encoders and modulators block 10 is weighted by an associated distinct amplitude $\sqrt{p_m(k)}$, $m=1, \ldots, M$. As shown in FIG. 1, each of the M symbol streams is multiplied by $\sqrt{p_m(k)}$, $m=1, \ldots, M$ at multipliers 12. At every interval k, these amplitudes must satisfy $$\sum_{m=1}^{M} p_m(k) = P$$

so that the power budget P is not exceeded. Namely, the sum of the transmission powers for the symbols streams can not exceed the power P available at the transmitter. Thus, $p_m(k)/P$ indicates the fraction of the total transmitted power P that is allocated to the m-th symbol during interval k. For convenience, we can assemble the transmission powers onto the following diagonal matrix:

$$P(\kappa) = \begin{bmatrix} p_1(k) & 0 & \cdots & 0 \\ 0 & p_2(k) & p_2(k) & \vdots \\ \vdots & 0 & \ddots & 0 \\ 0 & \cdots & 0 & p_M(k) \end{bmatrix}$$

After being allocated its power, the m-th symbol is multiplied by a vector $[V_{1,m}(k) \; V_{2,m}(k) \ldots V_{M,m}(k)]$ which steers it spatially. As shown in FIG. 1, a set of M multipliers 14 is associated with each symbol stream, and multiplies the symbol stream by the associated steering vector. These M steering vectors, each of which has M complex coefficients, may be assembled into an M×M matrix as shown below.

$$V(\kappa) = \begin{bmatrix} V_{1,1}(k) & V_{1,2}(k) & L & V_{1,M}(k) \\ V_{2,1}(k) & V_{2,2}(k) & & \vdots \\ \vdots & & 0 & \ddots \\ V_{M,1}(k) & \cdots & & V_{M,M}(k) \end{bmatrix}$$

The matrix V, in an exemplary embodiment, is unitary, i.e. such that $VV^H=I$, where I denotes the identity matrix. Consequently:

a) Each of the steering vectors (each column of V) has unit norm, that is, $$\sum_{j=1}^{M} |V_{j,m}|^2 = 1 \text{ for } m = 1, \ldots, M$$

and therefore the power allocation P is not altered. Each symbol retains its power through the steering process.

b) The M steering vectors (columns of V) are mutually orthogonal and thus they do not interfere with each other.

The last step in the steering process is the combining. The sum of the j-th entry of each of the M steered symbols results in the signal that will be transmitted by the j-th antenna, for $j=1, \ldots, M$. As shown in FIG. 1, an adder 16 associated with each of the M antennas receives the associated entry in each of the M steered symbols, and combines them to form a signal for transmission.

Before being radiated, the M signals composed by the steering process are filtered and upconverted onto their appropriate frequency by an associated RF block 18. Finally, the resulting RF signals are fed onto the M transmit antennas 20.

Next, an exemplary embodiment of determining the transmission powers and steering vectors to optimize the transmit signal in order to maximize the capacity of the wireless links, according to the present invention will be described. As discussed above, the transmission powers may be characterized as a matrix P (whose diagonal entries describe the power allocation) and the steering vectors may be characterized as a matrix V (whose columns are the steering vectors). The covariance of the transmitted signal equals $VPV^H$, the application of the invention results in a signal whose covariance is optimum in a capacity-sense.

At interval k, the columns of V(k) are computed to be the eigenvectors of $E[H^HH]$, where the expectation is computed over the distribution of H during the interval.

The computation of P is performed via a recursive algorithm which updates it at every interval based on (i) the distribution of H during the interval, and (ii) the value of P at the previous interval. In acquisition mode, P is initialized arbitrarily and then the optimum powers are found after a few iterations. In steady state, the algorithm tracks the optimum set of powers as the channel distribution slowly varies.

In order to formulate the algorithm, it is useful to introduce—as an auxiliary quantity—the mean-square error that would be experienced when estimating with a linear minimum mean-square error filter the m-th transmitted signal (i.e., the signal steered by the m-th column of V). Defining $$B_{-m} = \left[ I + \frac{1}{M\sigma^2} \tilde{H}_{-m} P_{-m}(k) \tilde{H}_{-m}^H \right]^{-1}$$

where $\tilde{H}=HV$ while $\tilde{H}_{-m}$ and $P_{-m}(k)$ indicate the corresponding matrices without the m-th column, such mean-square error is given by $$MSE_m(k) = \frac{1}{1 + \frac{p_m(k)}{M\sigma^2} \tilde{H}_m^H B_{-m} \tilde{H}_m}$$

with $\tilde{H}_m$ denoting the m-th column of $\tilde{H}$.

The algorithm is as follows. At interval k+1:
1) The first step is to compute, for m=1, ..., M, $$p'_m(k+1) = \max\left(p_m(k), \frac{E[Tr\{B_{-m}\}] + P\frac{1-E[MSE_m(k)]}{p_m(k)} - N}{\frac{1}{M\sigma^2}E[MSE_m(k)\tilde{H}_m^H B_m^2 \tilde{H}_m]}\right)$$

with the expectations taken with respect to the distribution of H during interval k
2) The second and final step yields the new value of P as $$P(k+1) = \frac{P}{\sum_{m=1}^{M} p'_m}\begin{bmatrix} p'_1 & 0 & 0 & 0 \\ 0 & p'_2 & 0 & 0 \\ 0 & 0 & \ddots & 0 \\ 0 & 0 & 0 & p'_M \end{bmatrix}$$

Namely, the second step normalizes the transmission powers determined in the first step such the available power at the transmitter is not exceeded.

In one exemplary embodiment of the present invention, the method described above is implemented as software in the processor of the receiver. The receiver, at each interval k, would convey the resulting V(k) and P(k) to the transmitter. In an alternative embodiment, the method is implemented as software at the transmitter with the receiver sending the transmitter the necessary information to determine the matrices V(k) and P(k). As further alternatives, the method according to the present invention may be implemented in hardwired circuits, firmware, FPGAs, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A method of optimizing transmit covariance for a multiple antenna transmitter, comprising:
   determining spatial steering of parallel symbol streams and a transmit power of each symbol stream based on a statistical distribution of a channel, the determining step, for each symbol stream, including,
      determining a first possible transmission power based on a kth transmission power for the symbol stream, where k represents an interval of time,
      determining a second possible transmission power based on the kth transmission power for the symbol stream and the statistical distribution of the channel, and
      determining the (k+1)th transmission power for the symbol stream based on the first and second possible transmission powers.
2. The method of claim 1, wherein the determining the (k+1)th transmission power further comprises:
   selecting one of the first and second possible transmission powers; and
   scaling the selected transmission powers for the symbol streams so that a sum of the selected transmission powers for the symbol streams does not exceed an available amount of power at a transmitter, the scaled selected transmission powers serving as the (k+1)th transmission powers.
3. The method of claim 2, wherein the selecting step selects a maximum one of the first and second possible transmission powers.
4. The method of claim 1, wherein the determining a second possible transmission power step determines the second possible transmission power based on the (k)th transmission power, the statistical distribution of the channel, and an available amount of power at a transmitter.
5. The method of claim 1, wherein the determining a second possible transmission power step determines the second possible transmission power based on the (k)th transmission power, the statistical distribution of the channel, and a noise power at a receiver.
6. The method of claim 1, wherein the determining a second possible transmission power step determines the second possible transmission power based on the (k)th transmission power, the statistical distribution of the channel and a number of receive antennas.
7. The method of claim 1, wherein the determining the (k+1)th transmission powers step determines the (k+1)th transmission powers according to the following expression:
   for m=1, ..., M, where M is the number of transmit antennas,

$$p'_m(k+1) = \max\left(p_m(k), \frac{E\left[Tr\left\{B_{-m} + \frac{P}{M\sigma^2}\tilde{H}_m\tilde{H}_m A\right\}\right] - N}{E\left[\frac{\tilde{H}_m(B_{-m})^2\tilde{H}_m}{M\sigma^2 + p_m(k)\tilde{H}_m B_{-m}\tilde{H}_m}\right]}\right)$$

where $p'_m(k+1)$ is a (k+1)th second possible transmission power for the mth symbol stream, H represents the statistical distribution of the channel, $\tilde{H}=HV$ with V computed to be the eigenvectors of $E[H^H H]$, N is a number of receive antennas, $\sigma^2$ indicates an arithmetic mean of the noise variances at the N receive antennas, matrix A is given by, $$A = \left(I + \frac{1}{M\sigma^2}\tilde{H}P(k)\tilde{H}^H\right)^{-1}$$

while the M matrices $B_{-m}$, m=1, ..., M, are given by $$B_{-m} = \left[I + \frac{1}{M\sigma^2}\tilde{H}_{-m}P_{-m}(k)\tilde{H}_{-m}^H\right]^{-1}$$

where $\tilde{H}_{-m}$ and $P_{-m}(k)$ indicate the corresponding matrices without the m-th column, and $\tilde{H}_m$ denotes the m-th column of H.

* * * * *